March 4, 1930.  A. M. EUBANKS  1,749,377

SHIPPING COOP

Filed Nov. 10, 1927

INVENTOR.
ADAH M. EUBANKS,
BY
F. P. Lorin
ATTORNEY.

Patented Mar. 4, 1930

1,749,377

UNITED STATES PATENT OFFICE

ADAH M. EUBANKS, OF CHARLESTON, WASHINGTON

SHIPPING COOP

Application filed November 10, 1927. Serial No. 232,393.

This invention relates to an improvement in shipping crates or coops for live poultry in which particular provision is made to prevent possible injury to the poultry during transportation and to protect them as far as possible from injurious draughts while at the same time facilitating the necessary feeding operation in a simple and convenient manner.

The improved coop is constructed substantially solid on the bottom and throughout a portion of the height of the sides and ends which will enable the poultry, when in the roosting position which is the natural position assumed by the poultry during transportion, to be protected against any cold air currents blowing through the coop; that portion of the coop above the protected area being of the usual slatted construction to afford proper ventilation.

A further object is the provision of a separated section of the coop into which the feeding receptacle may be introduced, this feeding section of the coop having a slatted end to permit the poultry to readily reach the food or water in the feeding receptacle, with such slatted end arranged sufficiently far from the ends of the coop to prevent the poultry directly reaching such ends.

The improved coop is illustrated in the accompanying drawings, in which.

Figure 1:
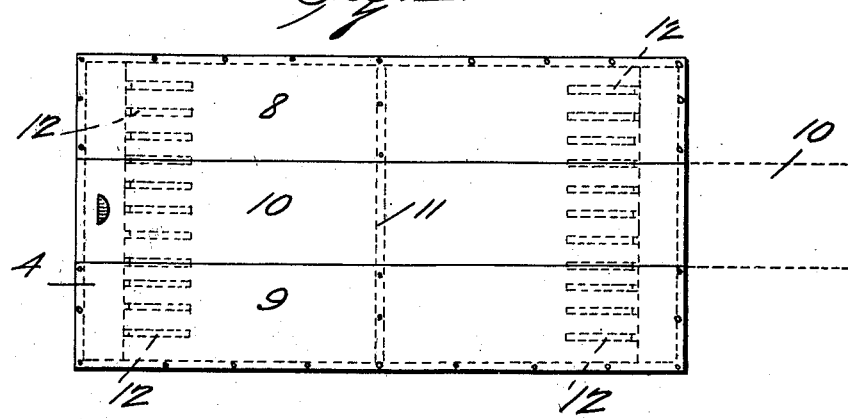
Figure 1 is a plan view of the coop, the removable section through which the poultry is introduced and removed from the coop being shown partially open in dotted lines.
Figure 2:
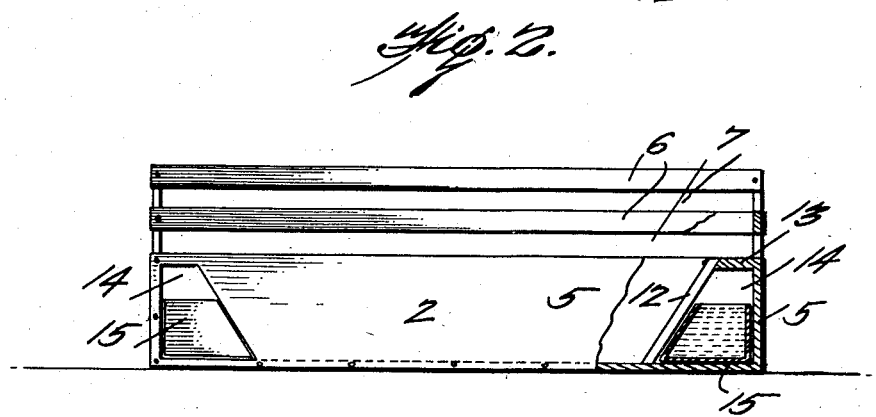
Figure 2 is a side elevation of the coop, partly in section.
Figure 3:
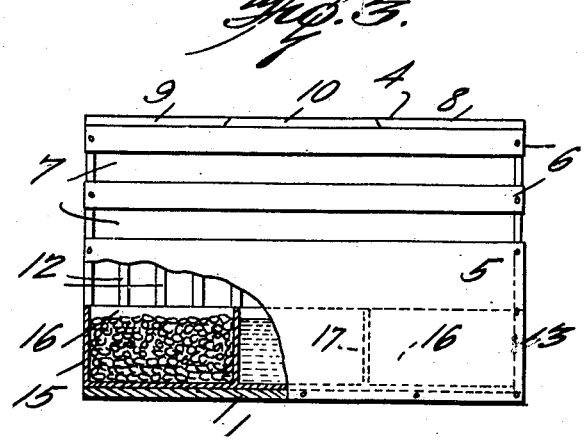
Figure 3 is an end elevation of the coop, partly in section.

The improved coop, which is preferably though not necessarily constructed of wood and may be made in any appropriate size, includes a bottom 1, sides 2, ends 3 and a top 4. The bottom is preferably constructed without openings, that is, solid whether made of a single piece of material or a number of such pieces closely associated. The sides 2 and 3 are constructed of solid walls 5 for a portion of the height of the coop, this solid portion extending to such a height on the coop that the poultry, when in the usual recumbent position within the coop, are wholly protected by these solid sides and ends. The remaining portions of the sides 2 and 3 are the usual slatted formation, as at 6, thereby providing openings to afford the necessary ventilation to the interior of the coop.

The top of the coop is also preferably solid, involving two fixed sections 8 and 9 and an intermediate or central sliding section 10, which latter is moved in an obvious manner to permit the poultry to be introduced into or removed from the coop without at the same time affording an opening through which the poultry already in the coop may escape.

The coop is preferably divided into two compartments by a transverse partition 11 and the respective ends of the coop are provided inwardly of the coop end with upstanding, outwardly inclined walls 12 which extend from the bottom of the coop to a horizontal partition 13 which is substantially on a line with the upper edge of the solid portions 5 of the ends of the coop.

There is thus defined a space 14 at the respective ends of the coop which open through the sides, this space being designed to receive a feeding receptacle 15 which, if desired, may be divided to present end compartments 16 for solid food and a central compartment 17 for water. Obviously, the feeding receptacles may be introduced into the coop without the necessity of disturbing the poultry therein, and when in position such feeding receptacles are accessible through the slatted walls 12. It is to be noted that the slatted walls 12 are at such distances from the ends of the coop that the latter cannot be reached by the poultry through the slatted walls.

Experience has demonstrated that poultry in transit and particularly after feeding will crouch in a roosting position on the floor of the coop and it is apparent that when in this position, the solid sides and ends prevent any direct air currents from reaching the poultry while the slatted upper portions of the coop provide a sufficient free passage of air to insure proper ventilation. By reason of the solid bottom, there is no liability of the feet of the poultry being caught in the usual slatted formation and the solid sides and ends prevent the poultry from reaching through to the poultry of adjacent coops with the liability of injury to their heads and necks.

The facility with which the feeding receptacles may be introduced and removed saves a great deal of time in feeding and watering poultry during transportation and the division of the coop into two separate compartments insures that, with a proper number of fowl in each compartment, ample feeding facilities for all the fowl will be provided by the feeding means described.

What I claim to be new is:

A coop comprising a solid bottom, side and end walls, said side and end walls being solid from the bottom to a point about half way the height of the coop and the remaining portions of such side and end walls being formed of spaced apart slats, the solid portions of the side walls at opposite ends being formed with openings, the inner walls thereof being inclined upwardly toward the end walls, feed and water troughs at opposite ends of the coop insertable in the end openings and each having an inner inclined wall corresponding to the inclination of the inner walls of the openings, short horizontal partitions extending inwardly from the solid portions of the end and side walls, inclined spaced apart strips extending from the inner edges of the horizontal partitions to the bottom of the coop in alignment with the inner walls of the end openings, and a vertically disposed central partition extending across the coop between the opposite solid portions of the side walls.

In testimony whereof I affix my signature.

ADAH M. EUBANKS.